United States Patent

Franzi

(10) Patent No.: US 12,141,309 B2
(45) Date of Patent: Nov. 12, 2024

(54) METHOD FOR MANAGING THE USE OF DATA IN A WATCH

(71) Applicant: Tissot SA, Le Locle (CH)

(72) Inventor: Edoardo Franzi, Cheseaux-Noreaz (CH)

(73) Assignee: Tissot SA, Le Locle (CH)

( * ) Notice: Subject to any disclaimer, the term of this patent is extended or adjusted under 35 U.S.C. 154(b) by 163 days.

(21) Appl. No.: 17/781,273

(22) PCT Filed: Nov. 24, 2020

(86) PCT No.: PCT/EP2020/083155
§ 371 (c)(1),
(2) Date: May 31, 2022

(87) PCT Pub. No.: WO2021/110470
PCT Pub. Date: Jun. 10, 2021

(65) Prior Publication Data
US 2022/0414249 A1    Dec. 29, 2022

(30) Foreign Application Priority Data
Dec. 6, 2019 (EP) ..................... 19214187

(51) Int. Cl.
*G06F 21/62* (2013.01)
*G04G 21/02* (2010.01)
(Continued)

(52) U.S. Cl.
CPC ....... *G06F 21/6218* (2013.01); *G04G 21/025* (2013.01); *G06F 21/32* (2013.01); *G06F 21/36* (2013.01)

(58) Field of Classification Search
CPC ...... G06F 21/6218; G06F 21/32; G06F 21/36; G04G 21/025; G04G 9/0064; G04G 21/02
See application file for complete search history.

(56) References Cited

U.S. PATENT DOCUMENTS

2009/0224889 A1    9/2009  Aggarwal et al.
2015/0074797 A1*   3/2015  Choi ............... H04W 12/065
                                                      726/19
(Continued)

FOREIGN PATENT DOCUMENTS

CN    104620226 A    5/2015
CN    205068395 U    3/2016
(Continued)

OTHER PUBLICATIONS

International Search Report issued Feb. 1, 2021 in PCT/EP2020/083155 filed on Nov. 24, 2020, 2 pages.
(Continued)

*Primary Examiner* — Trong H Nguyen
(74) *Attorney, Agent, or Firm* — Oblon, McClelland, Maier & Neustadt, L.L.P.

(57) ABSTRACT

A method controls access to at least one confidential datum archived in a memory element of a watch. The memory element includes general data and confidential data, the access to which by a function of the watch requires the wearer of the watch to be identified. The method includes authenticating the wearer to grant access to the functions of the watch, selecting one of the functions of the watch requiring the use of at least one of the confidential data or general data archived in the memory element, determining the category to which the at least one datum required by the function belongs, verifying the identity of the wearer based on an interaction between the wearer and a graphical representation included in the watch, and authorizing use of the at least one confidential datum by the function when the identity of the wearer has been verified.

6 Claims, 1 Drawing Sheet

(51) Int. Cl.
*G06F 21/32* (2013.01)
*G06F 21/36* (2013.01)

(56) References Cited

U.S. PATENT DOCUMENTS

| | | |
|---|---|---|
| 2015/0220109 A1 | 8/2015 | Von Badinski et al. |
| 2015/0304322 A1 | 10/2015 | Zaidi et al. |
| 2016/0004224 A1 | 1/2016 | Pi |
| 2016/0078697 A1* | 3/2016 | Lee .................. G07C 9/257 340/5.53 |
| 2016/0246326 A1 | 8/2016 | Von Badinski et al. |
| 2017/0235332 A1 | 8/2017 | Von Badinski et al. |
| 2017/0235333 A1 | 8/2017 | Von Badinski et al. |
| 2017/0235334 A1 | 8/2017 | Von Badinski et al. |
| 2017/0235933 A1 | 8/2017 | Von Badinski et al. |
| 2017/0323141 A1* | 11/2017 | Lee .................. G06V 40/1318 |
| 2019/0012443 A1 | 1/2019 | Kwok-Suzuki et al. |
| 2019/0075095 A1 | 3/2019 | Venable et al. |
| 2019/0086951 A1 | 3/2019 | Von Badinski et al. |
| 2019/0204865 A1 | 7/2019 | Von Badinski et al. |
| 2019/0236253 A1* | 8/2019 | Wang .................. H04M 1/02 |
| 2019/0384354 A1 | 12/2019 | Von Badinski et al. |
| 2020/0089272 A1 | 3/2020 | Von Badinski et al. |
| 2020/0401183 A1 | 12/2020 | Von Badinski et al. |

FOREIGN PATENT DOCUMENTS

| | | |
|---|---|---|
| CN | 106709301 A | 5/2017 |
| CN | 107851247 A | 3/2018 |
| CN | 108932422 A | 12/2018 |
| CN | 108985030 A | 12/2018 |
| CN | 110086786 A | 8/2019 |
| CN | 110493162 A | 11/2019 |
| EP | 1 241 538 A1 | 9/2002 |
| EP | 1 032 118 B1 | 11/2005 |
| FR | 2102184 A1 | 4/1972 |
| FR | 3 073 301 A1 | 5/2019 |
| KR | 10-2018-0134470 A | 12/2018 |
| KR | 10-2019-0004029 A | 1/2019 |
| KR | 10-2019-0017315 A | 2/2019 |
| KR | 10-2020-0000776 | 1/2020 |
| WO | WO 2018/231713 A1 | 12/2018 |

OTHER PUBLICATIONS

Combined Chinese Office Action and Search Report issued Apr. 4, 2024 in corresponding Chinese Patent Application No. 202080084344.9, 11 pages.

\* cited by examiner

METHOD FOR MANAGING THE USE OF DATA IN A WATCH

CROSS-REFERENCE TO RELATED APPLICATIONS

The present application is a national stage entry of International Application No. PCT/EP2020/083155, filed Nov. 24, 2020, which claims priority to European Patent Application No. 19214187.7, filed on Dec. 6, 2019, the entire content and disclosure of which are incorporated by reference herein.

TECHNICAL FIELD

The present invention relates to a method for verifying the use of data archived in a watch, which in particular allows access to at least one confidential datum archived in a memory element of this watch to be controlled.

The invention further relates to a system implementing such a method as well as to a watch comprising this system and a computer program.

PRIOR ART

A watch comprises a set of functions that can be used by the wearer. Such functions can allow personal data of this wearer to be viewed or grant access to services such as banking services, commercial services (online shops, e-commerce companies) or e-mail or instant messaging services. In such a context, one drawback in this case lies in the fact that once the wearer of the watch has been authenticated, any individual whatsoever can access the functions of the watch, in particular in the event that it has been stolen, and can thus access the wearer's personal and confidential data.

It is understood that there is a need to find a solution that in particular overcomes the drawbacks of the prior art.

SUMMARY OF THE INVENTION

One purpose of the present invention is thus to provide a secure, reliable, safe and robust solution for controlling access to the confidential data archived in a memory element of a watch.

The invention relates to a method for controlling access to at least one confidential datum archived in a memory element of a watch, said memory element comprising two categories of data, general data and said confidential data, the access to which by a function of said watch requires the wearer of the watch to be identified, the method including the following steps of:
  authenticating the wearer of the watch in order to grant access to the functions of this watch;
  selecting one of said functions of the watch requiring the use of at least one of said confidential data or general data archived in the memory element;
  determining the category to which said at least one datum required by the function belongs;
  verifying the identity of the wearer of the watch on the basis of an interaction between the wearer of this watch and a graphical representation included in said watch, and
  authorising use of said at least one confidential datum by the function if the identity of the wearer of the watch has been verified.

According to other embodiments:
  the determination step comprises a sub-step of estimating an access criterion for said datum which defines whether said datum belongs to the confidential data category or to the general data category;
  the determination step comprises a sub-step of comparing the estimated access criterion with a reference criterion;
  the verification step comprises a sub-step of presenting a graphical representation on/in the visual information broadcast interface of said watch;
  the verification step comprises a sub-step of generating a digital identifying element on the basis of said at least one biometric information element comprised in the acquired images of the portion of skin;
  the verification step comprises a sub-step of validating a digital identifying element generated with a view to identifying the wearer;
  the biometric information element relates to a vascular network or to a texture of this skin.

The invention further relates to a system for controlling access to at least one confidential datum archived in a memory element of a watch, implementing this method, the system comprising the following interconnected elements: a processing unit, a multispectral biometric skin sensor, an input interface, a visual information broadcast interface and the memory element comprising two categories of data, general data and said confidential data.

The invention further relates to a watch, in particular a mechanical smartwatch, including such a system.

The invention further relates to a computer program comprising program code instructions for executing the steps of this method when said program is executed by a processing unit.

BRIEF DESCRIPTION OF THE FIGURES

Other specific features and advantages will be clearly observed in the following description, which is given as a rough guide and in no way as a limiting guide, with reference to the accompanying figures, in which.

DETAILED DESCRIPTION OF THE INVENTION

Figure 1:
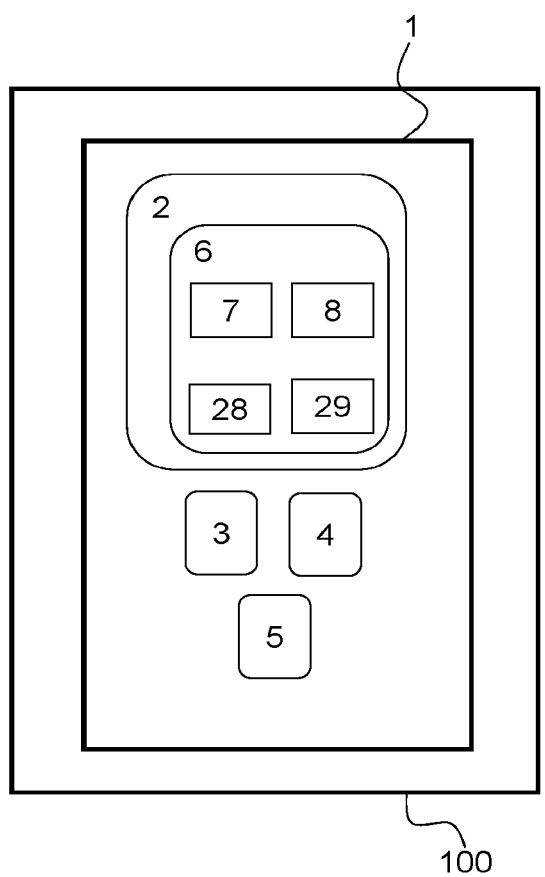
FIG. 1 is a diagrammatic view of a watch comprising a system for controlling access to at least one confidential datum archived in a memory element of this watch, according to one embodiment of the invention.

FIG. 1 shows a watch comprising a system 1 for controlling access to at least one confidential datum archived in a memory element of this watch. Such a watch 100 is preferably a mechanical smartwatch 100 comprising a body such as a watch case, and an attachment element such as a bracelet allowing this body to be fixed, for example, to the wrist of the wearer. This watch 100 more specifically comprises, in a non-limiting and/or non-exhaustive manner:
  a processing unit 2 including hardware and software resources, in particular at least one processor cooperating with a memory element 3, said memory element 3 comprising in particular two categories of data, general data 27 and confidential data 26;
  a visual information broadcast interface 4, such as a hybrid display dial provided with a first analogue display component and with a second digital and/or alphanumerical display component;

an input interface 5 such as a keypad or even a touch-sensitive interface included, for example, in the visual information broadcast interface 4, and a multispectral biometric skin sensor 7 comprising at least one photographic sensor 8a, at least one multispectral illumination source 8b and at least one thermal image sensor 8c, the illumination source 8b being capable of emitting light radiation in wavelengths comprised between 300 and 1,100 nm; furthermore, this illumination source 8b can be of the laser type.

In the present embodiment of the invention, the confidential data 26 are personal/secret/private data of the wearer of the watch 100 and the access to which by a given function of this watch 100 requires the wearer to be identified. General data are so-called "public" data which can be related to the wearer and to which a given function can have free access. For the purposes of illustration, the confidential data 26 can comprise digital files relating to images, videos, documents (for example in text, spreadsheet, XML format, etc.) containing confidential information such as the wearer's personal information (bank details, name, address, date of birth, weight, age, gender, heart rhythm, sleep cycle, etc.). This confidential data 26 can further comprise encryption/decryption keys, certificates, authentication codes, passwords and personal codes.

In this watch 100, the processing unit 2 is connected to the visual information broadcast interface 4, to the input interface 5 and to the multispectral biometric sensor 7, among other elements. It should also be noted that the multispectral biometric sensor 7 is arranged in the body of the electronic device 100 and/or in the attachment element.

In this watch, the memory element 3 of the processing unit 2 of the watch 100 comprises confidential data 26 and general data 27, as well as parameters for classifying this data into one of these two categories: confidential or general. These memory elements 6 of the processing unit 2 further comprise at least one graphical representation 7 enabling the wearer to be identified, as will be seen hereinbelow. This graphical representation 7 can, for example, be an image comprising at least one object. For example, this image defines a scene comprising a plurality of objects such as houses, vehicles and/or a celestial body such as the moon, etc. It is clear that this image can define other types of scenes containing at least one object. These memory elements 6 further include data relating to a reference sequence 8 comprising reference identification portions of this graphical representation 7, said portions having been previously selected by the wearer of the watch 100 during a configuration process relating to the identification of the wearer.

Figure 2:
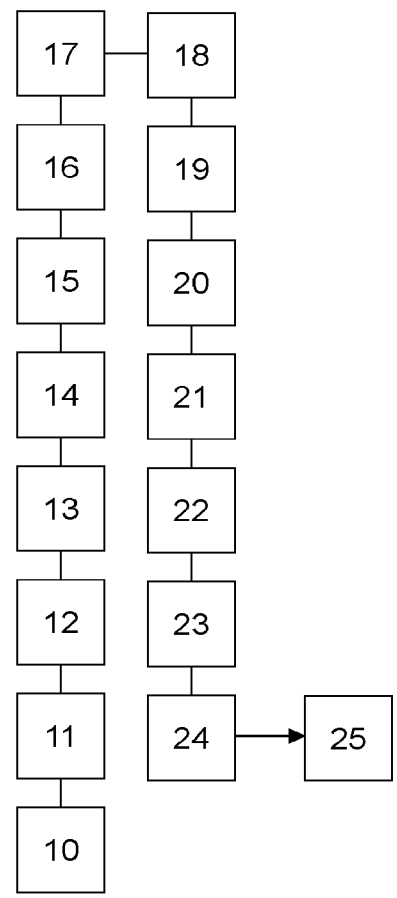
FIG. 2 is a flow chart relating to a method for controlling access to at least one confidential datum archived in the memory element of the watch, according to the embodiment of the invention.

As shown in FIG. 2, the system 1 is capable of implementing a method for controlling access to at least one confidential datum archived in a memory element of a watch, said memory element comprising two categories of data, general data 27 and said confidential data 26.

This method comprises a step of authenticating 10 the wearer of the watch 100 granting access to the use of functions of this watch 100. This authentication step 10 thus makes it possible to identify the wearer of the watch with certainty so that he/she can have access to the use of all the functions of this watch 100. In other words, it allows the wearer to prove his/her identity by providing for the input of an authentication code or secret code through an interaction between the wearer and the input interface 34.

Moreover, it is understood that the functions can be implemented by processing algorithms executed by the processing unit 2 of the watch 100 when these functions are activated/selected following an interaction between the wearer and the input interface 5 of this watch 100. These algorithms thus executed require the use of general data 27 and/or confidential data 26. In examples set out here in a non-limiting and non-exhaustive manner, these functions of the watch can relate to an image or video editing function, a word processing function, a function for logging into a banking service, a function for logging into a commercial service (online shops, e-commerce companies), or a function for logging into an e-mail or instant messaging service.

Following this authentication step 10, the method comprises a step of selecting 11 one of said functions of the watch requiring the use of at least one of said confidential data 26 or general data 27 archived in the memory element. In this step 11, this function is selected from all the functions of the watch that are displayed on the visual broadcast interface 4 as a result of an interaction between the wearer and the input interface 5 of this watch 100. As mentioned hereinabove, such an interaction thus contributes to the execution, by the processing unit 2, of a processing algorithm intended to carry out this function in particular on the basis of at least one datum archived in the memory element 3 that is required to implement this algorithm.

The method then comprises a step of determining 12 the category to which said at least one datum required by the function belongs. This step 12 comprises a sub-step of estimating 13 an access criterion for said datum which defines whether said datum belongs to the confidential data 26 category or to the general data 27 category. This sub-step 13 comprises a phase of implementing computation operations, carried out by the processing unit 2, to obtain this access criterion on the basis of said datum, of the nature or of the type of the function and of a classification parameter of this datum. Such a parameter is archived in the memory element of the processing unit of the watch and is associated with the corresponding datum. This parameter defines whether said datum belongs to one or the other of the confidential data 26 or general data 27 categories, depending on the nature or type of the various functions of the watch that may require such a datum within the scope of the implementation thereof.

Thus, this parameter can be used to define that a datum such as an image is a confidential datum for a given function and a general datum for another function of the watch. It is thus understood that in this context, whether the datum belongs to one or the other of these two categories depends on the function that requires the use thereof.

The determination step 12 then includes a sub-step of comparing 14 this estimated access criterion with a reference criterion. In this context, said at least one datum required by the function belongs to the confidential data 26 category if the access criterion is greater than or equal to the reference criterion. Conversely, if the access criterion is less than the reference criterion, then said at least one datum is included in the general data category.

The method then comprises a step of verifying 15 the identity of the wearer of the watch 100 on the basis of an interaction between the wearer of this watch 100 and a graphical representation comprised in said watch 100, more particularly a graphical representation displayed on/in the visual information broadcast interface 4 of said watch 100. Such a step 15 is systematically carried out following the selection of a function in order, in particular, to enable the processing unit 2 to check that the wearer of the watch 100 is still in possession thereof and that he/she is indeed the source of the selection of the function. This step 15 comprises a sub-step of presenting 16 a graphical representation 7 on/in the visual information broadcast interface 4 of said watch 100. This sub-step 16 includes a phase of generating 17 the display, on/in the visual information broadcast interface 4, of the graphical representation 7 provided for implementing this identification. This phase 17 can comprise a sub-phase of the wearer selecting, from among a sample of at least two graphical representations 7 displayed on the visual information broadcast interface 4, the graphical representation 7 provided for implementing this identification. It should be noted that the wearer is the only person that knows the graphical representation 7 he/she chose during a configuration process relating to this identification.

This presentation sub-step 16 then comprises a phase of triggering 18 a countdown once the generation phase 17 has been completed. In other words, the pre-configurable countdown is triggered once the graphical representation 7 is presented on the broadcast interface 4. Such a phase 17 contributes, on the basis of a limited time interval defined by this countdown, to counting down the estimated time required to input the sequence of identification portions of the graphical representation 7 displayed on/in the broadcast interface 4.

Subsequently, the verification step 15 comprises a sub-step of selecting 19, within the limited time interval, a sequence of at least two identification portions of said graphical representation 7 intended to identify said wearer, said sequence corresponding to an identification code for the wearer. Such identification portions are not directly visible in the graphical representation 7 presented on/in the broadcast interface 4. Under these conditions, the selection sub-step 19 comprises a phase 20 of viewing at least one of said identification portions of the sequence in said graphical representation 7. This viewing phase 17 comprises a sub-phase of selecting at least one area of interest of the graphical representation 7 that may comprise said at least one identification portion. During this sub-phase, the wearer selects, for example, a first area of interest or a second area of interest by zooming in on this first area or on this second area using the input interface 5. Once this first or second area of interest has been selected, the identification portions become visible. In this configuration, each identification portion that can be used to produce/constitute the sequence can be selected using the input interface 5.

It should be noted that the sequence comprises an ordered number of identification portions and that the selected area of interest can comprise, for example, three identification portions, of which only two are ordered successively one after the other in the sequence. In this context, the remaining identification portion requires, in order to become part of the sequence, an identification portion comprised in another area of interest of the graphical representation 7 to be selected.

Subsequently, the verification step 15 comprises a sub-step of validating 21 the selected sequence. This validation sub-step 21 comprises a phase of checking 22 that the selection of the sequence of identification portions has been carried out within the limited time interval defined by the countdown. Insofar as this selection was not made within the limited time interval, the validation sub-step 21 comprises a phase of repeating 23 the presentation 16 and selection 19 sub-steps. If the selection of the sequence is again not made within the limited time interval, access to the watch 100 and in particular access to the functions of this watch 100 is blocked. In this context, the wearer of the watch is asked to authenticate himself/herself again in order to prove his/her identity by inputting an authentication code or a secret code through an interaction between the wearer and the input interface 5.

Insofar as this selection was made within this limited time interval, the validation sub-step 21 thus comprises a comparison phase 23, implemented by the processing unit 2, comparing said selected sequence with the reference sequence 8. This comparison phase 23 comprises a sub-phase of rejecting the identification of the wearer if said sequence is substantially different or is different from the reference sequence 8. In this scenario, the execution by the processing unit 2 of the processing algorithm intended to carry out this function is stopped by the processing unit 2. Moreover, access to the watch 100 is also blocked and in particular access to the functions of this watch. In this context, the wearer of the watch is asked to authenticate himself/herself again, by executing the authentication step 10 again, in order to prove his/her identity by inputting an authentication code or a secret code through an interaction between the wearer and the input interface 34. More specifically, the wearer and owner of the watch 100 may no longer be in possession thereof.

Conversely, the comparison phase 23 further comprises a sub-phase of successfully identifying the wearer if said sequence is substantially similar or is similar to the reference sequence 8. In this case, the method thus provides for implementing a step of authorising 24 the use of said at least one datum belonging to the confidential data 26 category if the identity of the wearer of the watch has been verified. During this step 24, the processing unit 2 continues to execute the processing algorithm intended to carry out this function on the basis of the datum archived in the memory element 6.

The invention further relates to a computer program comprising program code instructions for executing steps 10 to 24 of this method when said program is executed by the processing unit 2 of the watch 100.

The invention claimed is:

1. A method for controlling access to at least one confidential datum archived in a memory element of a watch, said memory element comprising two categories of data, general data and confidential data, the access to the at least one confidential datum by a function of said watch requires a wearer of the watch to be identified, the method comprising:

authenticating, via a processor of the watch, the wearer of the watch in order to grant access to functions of the watch;

selecting, via the processor, a function of said functions of the watch requiring use of at least one datum of said confidential data or said general data archived in the memory element;

determining, via the processor, a category to which said at least one datum required by the selected function belongs;

verifying, via the processor, systematically after the selecting, an identity of the wearer of the watch based on an interaction between the wearer of the watch and a graphical representation included in said watch, the verifying including:

requiring the wearer to select the graphical representation from a sample of at least two graphical representations, after the graphical representation is selected, triggering a countdown, and requiring the wearer to select, before the countdown is completed, at least two identification portions in said graphical representation in a sequence corresponding to an identification code for the wearer; and authorizing, via the processor, use of said at least one confidential datum by the selected function when the identity of the wearer of the watch has been verified, said determining comprising estimating an access criterion for said at least one datum which defines whether said at least one datum belongs to the confidential data category or to the general data category, said estimating comprising a phase of implementing computation operations, carried out by the processor, to obtain the access criterion based on said at least one datum, of a nature or of a type of the selected function and of a classification parameter of the at least one datum, said classification parameter defining whether said at least one datum belongs to the confidential data category or the general data category, depending on a nature or type of the functions of the watch that require said at least one datum.

2. The method according to claim 1, wherein the determining comprises comparing the estimated access criterion with a reference criterion.

3. The method according to claim 1, wherein the verifying comprises presenting the sample of at least two graphical representations on/in a visual information broadcast interface of said watch.

4. A system for controlling access to at least one confidential datum the system comprising:
a processor;
a multispectral biometric skin sensor;
an input interface;
a visual information broadcast interface; and
a memory element comprising two categories of data, including general data and confidential data, the access to which by a function of said watch requires a wearer of the watch to be identified,
the processor being configured to:
authenticate the wearer of the watch in order to grant access to functions of the watch;
select a function of said functions of the watch requiring use of at least one datum of said confidential data or said general data archived in the memory element;
determine a category to which said at least one datum required by the selected function belongs;
verify systematically after the function is selected, an identity of the wearer of the watch based on an interaction between the wearer of the watch and a graphical representation included in said watch, the verifying including:
requiring the wearer to select the graphical representation from a sample of at least two graphical representations,
after the graphical representation is selected, triggering a countdown, and
requiring the wearer to select, before the countdown is completed, at least two identification portions in said graphical representation in a sequence corresponding to an identification code for the wearer; and
authorize, via the processor, use of said at least one confidential datum by the selected function when the identity of the wearer of the watch has been verified,
said determining the category comprising estimating an access criterion for said at least one datum which defines whether said at least one datum belongs to the confidential data category or to the general data category, said estimating comprising a phase of implementing computation operations, carried out by the processor, to obtain the access criterion based on said at least one datum, of a nature or of a type of the selected function and of a classification parameter of the at least one datum, said classification parameter defining whether said at least one datum belongs to the confidential data category or the general data category, depending on a nature or type of the functions of the watch that require said at least one datum.

5. A watch, comprising:
a system for controlling access to at least one confidential datum, the system comprising:
a processor;
a multispectral biometric skin sensor;
an input interface;
a visual information broadcast interface; and
a memory element comprising two categories of data, including general data and confidential data, the access to which by a function of said watch requires a wearer of the watch to be identified,
the processor being configured to:
authenticate the wearer of the watch in order to grant access to functions of the watch;
select a function of said functions of the watch requiring use of at least one datum of said confidential data or said general data archived in the memory element;
determine a category to which said at least one datum required by the selected function belongs;
verify systematically after the function is selected, an identity of the wearer of the watch based on an interaction between the wearer of the watch and a graphical representation included in said watch, the verifying including:
requiring the wearer to select the graphical representation from a sample of at least two graphical representations,
after the graphical representation is selected, triggering a countdown, and
requiring the wearer to select, before the countdown is completed, at least two identification portions in said graphical representation in a sequence corresponding to an identification code for the wearer; and
authorize, via the processor, use of said at least one confidential datum by the selected function when the identity of the wearer of the watch has been verified,
said determining the category comprising estimating an access criterion for said at least one datum which defines whether said at least one datum belongs to the confidential data category or to the general data category, said estimating comprising a phase of implementing computation operations, carried out by the processor, to obtain the access criterion based on said at least one datum, of a nature or of a type of the selected function and of a classification parameter of the at least one datum, said classification parameter defining whether said at least one datum belongs to the confidential data category or the general data category, depending on a nature or type of the functions of the watch that require said at least one datum.

6. The watch according to claim 5, wherein the watch is a mechanical smartwatch.

* * * * *